United States Patent
Bruel (10) Patent No.: US 9,781,748 B2
(45) Date of Patent: Oct. 3, 2017

(54) METHOD AND SYSTEM FOR TRANSMITTING MESSAGES USING A MOBILE COMMUNICATION DEVICE

(71) Applicant: SCHNEIDER ELECTRIC INDUSTRIES SAS, Rueil Malmaison (FR)

(72) Inventor: Marc Bruel, Corenc (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/416,416

(22) PCT Filed: Aug. 27, 2013

(86) PCT No.: PCT/FR2013/000222
§ 371 (c)(1),
(2) Date: Jan. 22, 2015

(87) PCT Pub. No.: WO2014/041255
PCT Pub. Date: Mar. 20, 2014

(65) Prior Publication Data
US 2015/0215970 A1    Jul. 30, 2015

(30) Foreign Application Priority Data

Sep. 11, 2012 (FR) ..................... 12 02415

(51) Int. Cl.
*H04L 1/00* (2006.01)
*H04W 76/02* (2009.01)
*H04B 7/26* (2006.01)
*G01D 4/00* (2006.01)
*H04W 88/04* (2009.01)

(52) U.S. Cl.
CPC .......... *H04W 76/02* (2013.01); *H04B 7/2606* (2013.01); *G01D 4/004* (2013.01);
(Continued)

(58) Field of Classification Search
CPC ........ H04J 3/16; H04J 3/17; H04J 3/18; H04J 3/19; H04L 29/06068; H04L 29/06069;
(Continued)

(56) References Cited

U.S. PATENT DOCUMENTS

2003/0028672 A1    2/2003  Goldstein
2003/0058096 A1    3/2003  Shteyn
(Continued)

FOREIGN PATENT DOCUMENTS

| CA | 2 756 751 | 1/2012 |
| CN | 1559120 A | 12/2004 |
| CN | 101449560 A | 6/2009 |

OTHER PUBLICATIONS

International Search Report Issued Oct. 28, 2013 in PCT/FR13/000222 Filed Aug. 27, 2013.
(Continued)

*Primary Examiner* — Dady Chery
(74) *Attorney, Agent, or Firm* — Oblon, McClelland, Maier & Neustadt, L.L.P.

(57) ABSTRACT

Message transmission system, including first and second networks (2, 3) of devices, and at least one mobile device (6, 7) provided with a non-volatile memory, each mobile device (6, 7) including a first communication means (16) configured to establish an automatic connection with at least one device (E1 to E5) of the first network (2), a second communication means (17) configured to establish an automatic connection with at least one device (4, 5) of the second network (3), and message processing means (15) configured to transmit messages stored in the non-volatile memory of the mobile device to each connected device, and to save the messages transmitted by the mobile device in the non-volatile memory of the mobile device.

18 Claims, 5 Drawing Sheets

(52) U.S. Cl.
CPC ............ *H04W 88/04* (2013.01); *Y02B 90/242* (2013.01); *Y02B 90/246* (2013.01); *Y04S 20/322* (2013.01); *Y04S 20/42* (2013.01)

(58) Field of Classification Search
CPC ......... H04L 65/00; H04L 65/01; H04L 65/02; H04L 65/03; H04L 47/10; H04L 47/11; H04L 47/12; H04L 47/13
USPC ....... 370/229, 230, 351, 356, 392, 464, 465, 370/466, 467; 709/223–224
See application file for complete search history.

(56) References Cited

U.S. PATENT DOCUMENTS

| | | |
|---|---|---|
| 2007/0274241 A1 | 11/2007 | Brothers |
| 2009/0146838 A1 | 6/2009 | Katz |
| 2010/0265095 A1 | 10/2010 | Cornwall et al. |
| 2010/0265096 A1 | 10/2010 | Cornwall et al. |
| 2011/0238844 A1* | 9/2011 | Lu ....................... H04W 76/021 709/227 |
| 2011/0273305 A1 | 11/2011 | Osterloh et al. |
| 2013/0099976 A1 | 4/2013 | Cornwall et al. |

OTHER PUBLICATIONS

French Search Report Issued Apr. 17, 2013 in Application No. FR 1202415 Filed Sep. 11, 2012.
Chinese Office Action dated Mar. 3, 2017 for Chinese Patent Application No. 201380045992.3 (w/English translation).

* cited by examiner

METHOD AND SYSTEM FOR TRANSMITTING MESSAGES USING A MOBILE COMMUNICATION DEVICE

BACKGROUND OF THE INVENTION

The invention relates to the transmission of messages by means of a mobile communication device, particularly a wireless mobile phone, and particularly a wireless smartphone.

STATE OF THE ART

Wireless smartphones can currently be used to recover data stored in devices, to supervise such devices. A smartphone is a telephone provided with electronic components enabling it to perform advanced operations in the same way as a computer. For example, the devices to be supervised may be interconnected within a local area network, LAN, that is, a network of devices which transmit messages to one another without using an intermediate router. Generally, a local area network has a limited geographical scale, for example, a computer room, a level of a building, or a firm site. Local area networks are interconnected by means of routers. Certain network architectures for controlling buildings, using the "Zigbee" protocol which is a short-distance communication protocol intended for low-consumption radio sets, may for example be mentioned. In such architectures, the communication nodes, which are the routers and the devices to be supervised, are fixed or mobile. However, such architectures take some time to reconfigure in case of a modification of the network topology and are not capable of instantaneously managing the mobility of communication nodes.

Further, in mobile telephony, smartphones may remotely connect, for example, to a wide area network, WAN, that is, a network of interconnected devices covering a wide geographical area, for example, at the scale of a country or of a continent, the largest wide area network being the Internet. In particular, the phones connect to the devices via fixed access points, such as GSM (Global System for Mobile Communications) relays.

Further, in the recovery of data originating from water, gas, or power meters, an operator may use a mobile device which is voluntarily displaced close to the devices to be supervised to recover the data via a local area network, LAN.

Then, after having recovered these data, he/she connects the mobile device to a distant computer, via a wide area network, WAN, to transmit the recovered data. However, a voluntary action of the operator is necessary to initialize each of the phases of data recovery or transmission from the local area network devices to the computer of the wide area network.

The case where a smartphone is used to connect a computer to the Internet can also be mentioned, the mobile phone having a component to connect to the computer via a wireless local area network, and an Internet management application to connect to the Internet. Such a communication mode however requires for both the LAN and WAN networks to be simultaneously available, the mobile phone then behaving as an instantaneous message router. Such a communication mode thus does not enable to transmit messages from a LAN network to a WAN network when the networks are alternately available.

SUMMARY OF THE INVENTION

The invention aims at overcoming such disadvantages, and more particularly at providing an autonomous message transmission method and device which requires no specific intervention from the user.

Another object of the invention is to provide simple and efficient means for transmitting data stored in devices belonging to a local area network to a distant device belonging to a wide area network, when the distant device cannot be connected to the local area network.

According to an aspect of the invention, a method for transmitting messages between a first network of devices and a second network of devices is provided, comprising at least one mobile device provided with a non-volatile memory.

The method includes a first communication step comprising at least one automatic connection between a mobile device and at least one device of the first network, and a second communication step comprising at least one automatic connection between a mobile device and at least one device of the second network, each automatic connection comprising transmitting the messages stored in the non-volatile memory of the mobile device of the automatic connection to each connected device, the method comprising saving the messages transmitted by each mobile device in the non-volatile memory of the mobile device.

Thus, messages can be automatically transmitted between a device of a local area network and a device of a wide area network when the networks are simultaneously or alternately available. It is not necessary for both networks to be available at the same time. Such a method advantageously enables to supervise devices located in specific premises, such as underground rooms, where the communication with a wide area network is impossible, or when the devices are in areas poorly covered with the wide area networks or WANs. Further, such a method enables to avoid using new fixed relay devices, such as fixed communication routers, distributed in the buildings.

Each connection of the first communication step may comprise an automatic connection of a mobile device with devices belonging to the first network only.

Thus, the mobile device behaves as a gateway between the two LAN and WAN networks which cannot directly communicate together.

Each connection of the second communication step may comprise an automatic connection of a mobile device with a single device belonging to the second network.

All the useful data can thus be centralized within a single device of the wide area network, WAN.

The automatic connections may be simultaneous or asynchronous.

Due to such a method, it is not necessary for all mobile devices to be connected to one of the networks at the same time.

Each device may comprise a non-volatile memory for storing messages to be transmitted, each connection of the first communication step comprising transmitting the messages stored in the non-volatile memory of each device of the first connected network to the non-volatile memory of the mobile device of the connection, each connection of the second communication step comprising transmitting the messages stored in the non-volatile memory of each device of the second connected network to the non-volatile memory of the mobile device of the connection, and the saving step comprising saving each message transmitted by each device in the non-volatile memory of the device which transmits the message.

The messages stored in the non-volatile memory of the devices of the first network may comprise application messages intended for at least one addressee device belonging to the second network, the messages stored in the non-volatile memory of the devices of the second network comprising application messages intended for at least one addressee device belonging to the first network, the method comprising a processing of the transmitted messages comprising, for each application message received by the device having the application message addressed thereto, storing in the non-volatile memory of the addressee device an acknowledgement message associated with the received application message, and the processing step comprising, for each acknowledgement message received by a device, suppressing from the non-volatile memory of the device of the application message associated with the received acknowledgement message.

Such a method particularly enables to empty the non-volatile memories of the messages which have been received by their addressee and which have been processed.

Each application message may comprise a unique non-zero identifier, and each device stores in its non-volatile memory a serial number initialized at the zero value, and the step of processing the transmitted messages comprises suppressing the application message received by a device if the identifier of the received application message is less than or equal to the serial number of the device, and incrementing the serial number of the device if the identifier has a value consecutive to that of the serial number of the device.

Thus, redundant messages which may be received a plurality of times by a same addressee device from different mobile devices are managed in a simple way.

According to another aspect of the invention, a system for transmitting messages, comprising first and second networks of devices, and at least one mobile device provided with a non-volatile memory, is provided.

In this system, each mobile device comprises a first communication means configured to establish an automatic connection with at least one device of the first network, a second communication means configured to establish an automatic connection with at least one device of the second network, and a message processing means configured to transmit messages stored in the non-volatile memory of the mobile device to each connected device, and to save the messages transmitted by the mobile device in the non-volatile memory of the mobile device.

Each first communication means may be configured to establish an automatic connection with devices belonging to the first network only.

Each second communication means may be configured to establish an automatic connection with a single device belonging to the second network.

The first and second communication means may be configured to establish automatic connections simultaneously or asynchronously.

Each device may comprise a non-volatile memory for storing the messages to be transmitted, each device of the first network comprises a message processing means configured to transmit messages stored in its non-volatile memory to the non-volatile memory of the mobile device to which it is connected, each device of the second network comprises a message processing means configured to transmit the messages stored in its non-volatile memory to the non-volatile memory of the mobile device to which it is connected, each device having a message processing means configured to save the messages transmitted by the device in the non-volatile memory of the device.

The messages stored in the non-volatile memory of the devices of the first network may comprise application messages intended for at least one addressee device belonging to the second network, the messages stored in the non-volatile memory of the devices of the second network comprise application messages intended for at least one addressee device belonging to the first network, each message processing means being configured to store, in the non-volatile memory of an addressee device which receives an application message addressed thereto, an acknowledgement message associated with the received application message, and to suppress from the non-volatile memory of a device which receives an acknowledgement message, the application message associated with the received acknowledgement message.

Each application message may comprise a unique non-zero identifier, each non-volatile memory comprises a serial number initialized at the zero value, and each message processing means is configured to suppress the application messages received by a device if the identifier of the received application message is less than or equal to the serial number of the device, and to increment the serial number of the device if the identifier has a value consecutive to that of the serial number of the device.

The first network of devices may correspond to the Internet and each mobile device is a wireless smartphone.

BRIEF DESCRIPTION OF THE DRAWINGS

The foregoing and other features and advantages of the present invention will be discussed in detail in the following non-limiting description of specific embodiments in connection with the accompanying drawings, among which.

DETAILED DESCRIPTION

Figure 1:
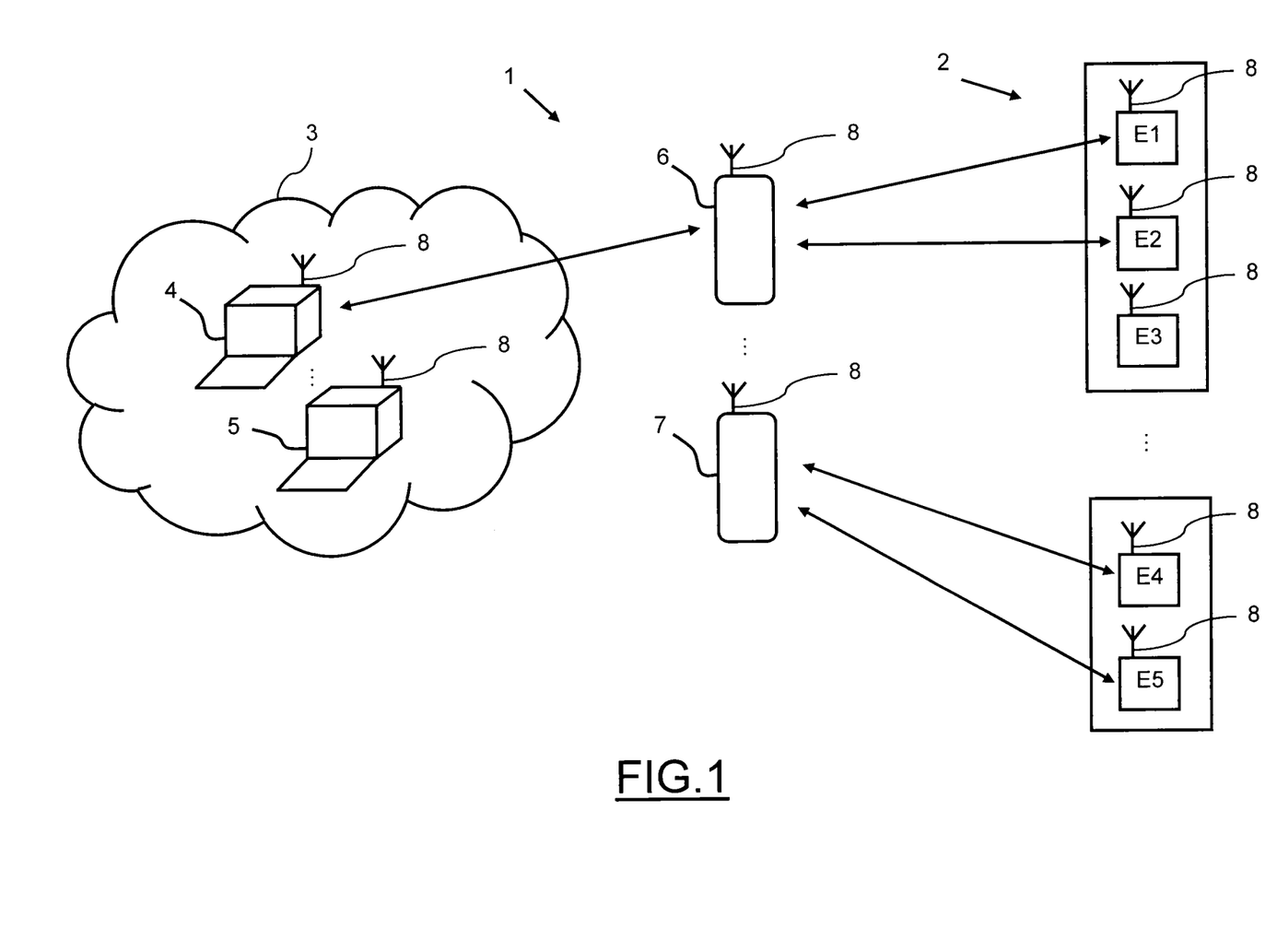
FIG. 1 schematically illustrates a message transmission device according to the invention.

FIG. 1 schematically shows a message transmission system 1, comprising a first network 2 of devices E1 to E5, and a second network 3 of devices 4, 5. First network 2 of devices corresponds to a LAN-type local area network. For example, the LAN may use the "Bluetooth" (trademark) technology or the "Wi-Fi" technology, which use short-range radio techniques intended to simplify connections between electronic devices. The devices of first network 2 are called devices to be supervised, they may for example be programmable automations intended for power distribution, smart meters for the distribution of gas or of water. They are located in dedicated premises and cannot be in direct communication with third wide area network 3.

Second network 3 of devices corresponds to a WAN-type wide area network, preferably the Internet. The devices of second network 3 are called distant devices, they may for example be portable or fixed computers, for example having a software application dedicated to supervising the devices of first network 2 by processing the data sampled from these devices E1 to E5. Preferably, second network 3 only comprises one supervision device 4 to promote the data centralization. Further, first network 2 of devices may use a communication protocol different from that of second network 3.

System 1 also comprises one or a plurality of mobile devices 6, 7. A mobile device may be a portable device, such as a laptop computer. Preferably, mobile devices 6, 7 are wireless mobile phones, particularly wireless smartphones.

Each device within system 1 has wireless communication means 8, such as antennas respectively coupled to communication means internal to the devices, which are configured to exchange messages. In particular, wireless communication means 8 enable mobile devices 6, 7 to exchange messages with the devices of first network 2, by radio waves, by infrared, or other optical means. They also enable mobile devices 6, 7 to exchange messages with distant devices, preferably by radio waves. Further, wireless communication means 8 do not enable devices E1 to E5 of first network 2 to exchange messages directly with those of second network 3.

The devices of first and second networks 2, 3 exchange messages via mobile devices 6, 7, which provide a relay for the message transmission. Mobile devices 6, 7 have a position which continuously varies, freely and randomly in the environment of devices to be supervised E1 to E5. FIG. 1 shows as an example a first mobile device 6 in communication with a distant device 4 and two devices to be supervised E1, E2. Second mobile device 7 is in communication with only two devices to be supervised E4, E5. Generally, at a given time, system 1 may comprise a mobile device which is in communication with no device, or a mobile device which is in communication with distant device 4 only, or also a combination of the previously-mentioned situations. In other words, mobile devices 6, 7 are successively locally connected to devices to be supervised E1 to E5, while being disconnectable from second network 3. Then, mobile devices 6, 7 connect to second network 3, while being disconnectable from devices to be supervised E1 to E5.

Generally, when a mobile device 6 passes close to one or a plurality of devices to be supervised E1 to E5, mobile device 6 establishes an automatic connection with each of these devices. In the example of FIG. 1, mobile device 6 is close to devices to be supervised E1, E2. Further, when a mobile device 6 passes close to one or a plurality of distant devices, generally via a GSM relay, mobile device 6 establishes an automatic connection with each of the distant devices. On each automatic connection, an automatic message transmission occurs. "Passing close" designates the fact that the mobile device is at a minimum distance from a device, to be supervised or distant, which is sufficient to establish a connection in order to transmit messages.

Figure 2:
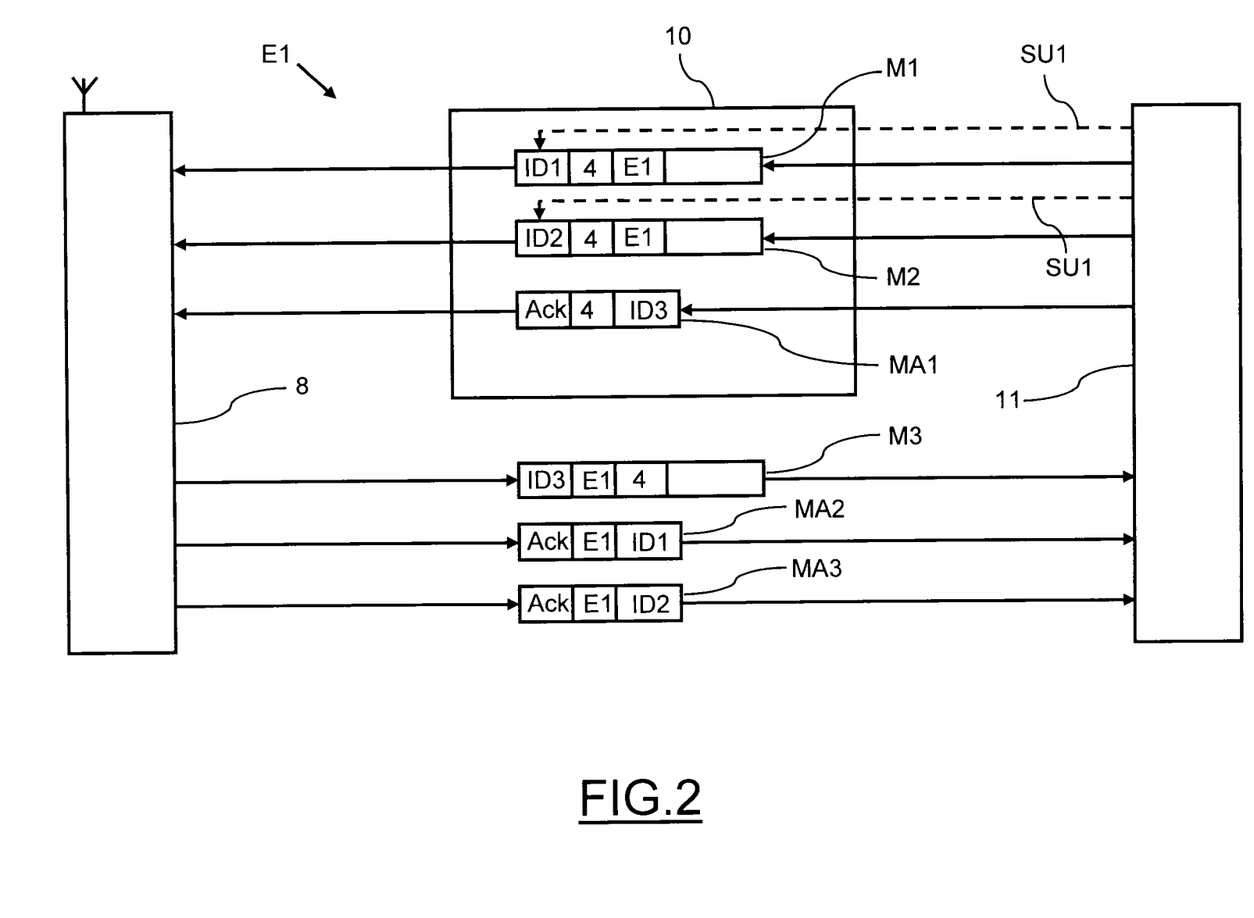
FIG. 2 schematically illustrates a device belonging to the first network of devices.

FIG. 2 shows the different elements of a device to be supervised E1 to E5. Each device to be supervised comprises a non-volatile memory 10 configured to store messages to be transmitted M1, M2, MA1, a message processing means 11 configured to transmit messages M1, M2, MA1, stored in its non-volatile memory 10, to one or a plurality of mobile devices 6, 7 to which it is connected. For example, FIG. 2 shows device to be supervised E1. Device E1 also receives messages M3, MA2, MA3 from the distant devices, which have been transmitted by one or a plurality of mobile devices 6, 7 to which device E1 has been connected. The processing means 11 stores in non-volatile memory 10 all the messages to be transmitted to a distant device 4, 5. Among the messages to be transmitted, application messages M1 to M3 can be distinguished from acknowledgement messages MA1 to MA3. An application message is a message transmitted by a device of a network 2 or 3 for a device of the other network 2 or 3. Each application message comprises a unique non-zero identifier ID1 to ID3, preferably integer-valued, an identifier of the device to which the message is addressed, an identifier of the device having transmitted the message, and useful data. For example, application message M1 comprises identifier ID1, it is intended for distant device 4, and will be transmitted by device to be supervised E1. The useful data are intended to be processed by software applications of the different devices. The useful data intended for the distant devices are for example used for the supervision and those intended for the devices to be supervised may for example be used to parameterize them. The useful data originating from the devices to be supervised may be alarms or status data. Further, the acknowledgement messages enable to notify that an application message has effectively been received by its addressee. Each acknowledgement message MA1 to MA3 is associated with the application message which has been received by its addressee. Acknowledgement messages MA1, MA2, MA3 comprise a specific header Ack, an identifier of the device for which the acknowledgement message is intended, and a unique identifier of the application message associated therewith ID1, ID2, ID3. For example, acknowledgement message MA1 is intended for addressee device 4, and is associated with application message M3. Preferably, acknowledgement messages comprise no useful data. When a mobile device 6, 7 passes close to device to be supervised E1, mobile device 6, 7 establishes an automatic connection with device to be supervised E1, and a message transmission occurs. The message exchanges are performed immediately at the connection, and are then event-triggered when device E1 stores messages in its non-volatile memory 10, or when it receives new messages from mobile device 6, 7 to which it is connected, as long as the connection between mobile device 6 and device to be supervised E1 is active. The processing means 11 of each device to be supervised is configured to:

receive acknowledgement messages MA2, MA3 originating from distant devices 4, 5 notifying that the distant devices have effectively received the associated application messages M1 and M2;

suppress SU1 from non-volatile memory 10, the application messages M1, M2 for which acknowledgement messages have been received;

transmit to a mobile device 6, 7 to which the device to be supervised is connected all the messages remaining in non-volatile memory 10, that is, the non-acknowledged messages and the acknowledgement messages;

receive application messages M3 originating from distant devices 4; and store in non-volatile memory 10 an acknowledgement message MA1 for each received application message M3.

Figure 3:
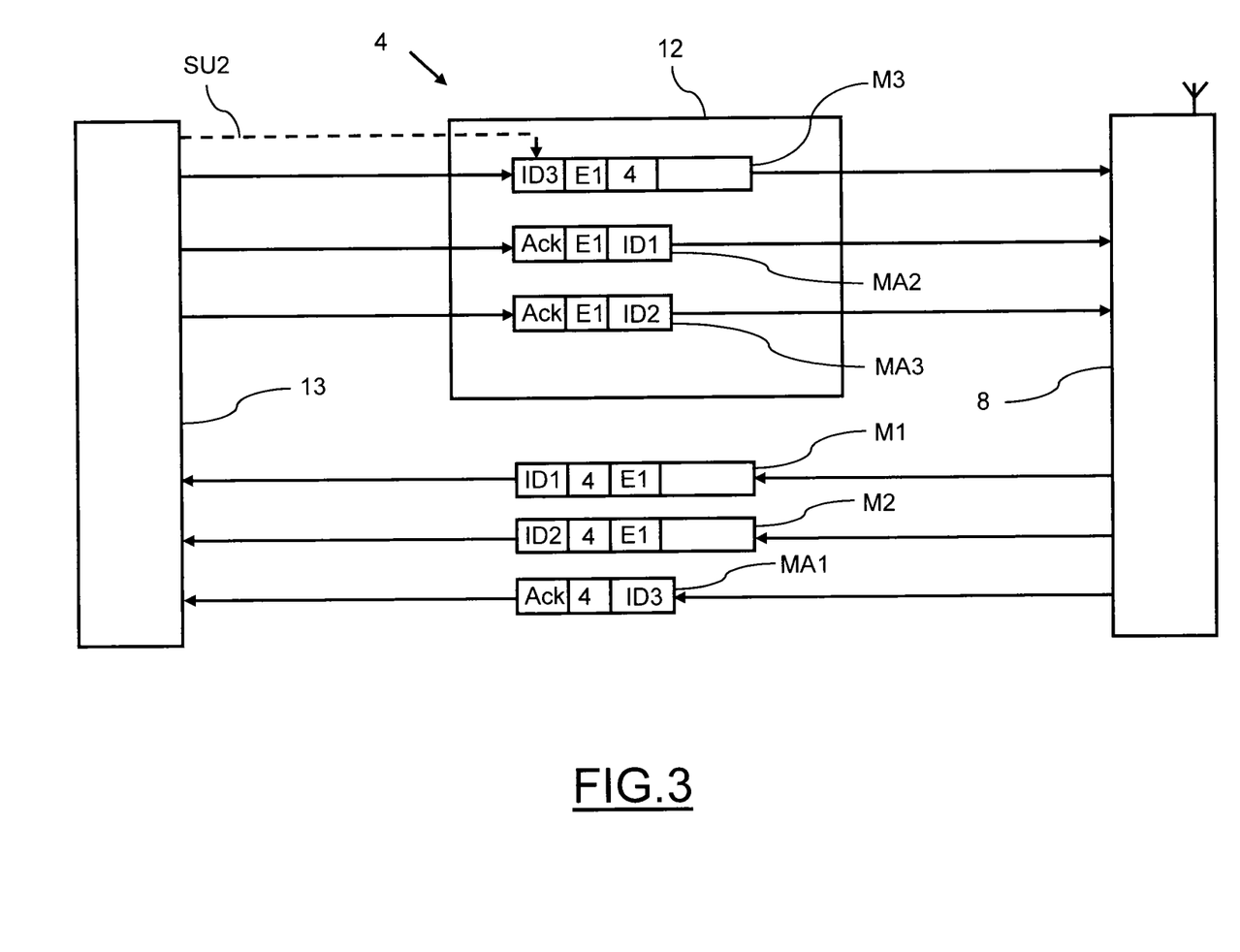
FIG. 3 schematically illustrates a device belonging to the second network of devices.

FIG. 3 shows the different elements of a distant device 4, 5. Each distant device comprises a non-volatile memory 12 configured to store messages to be transmitted M3, MA2, MA3, a message processing means 13 configured to transmit messages M3, MA2, MA3 stored in its non-volatile memory 12 to one or a plurality of mobile devices 6, 7 to which it is connected. For example, FIG. 3 shows distant device 4. Device 4 also receives messages M1, M2, MA1 from devices to be supervised E1 to E5. The processing means 13 store in non-volatile memory 12 all the messages to be transmitted to a device to be supervised. When a mobile device 6, 7 connects to a distant device, via the wide area network, WAN, an automatic message transmission takes place. The messages exchanges are performed immediately at the connection, and are then event-triggered when distant device 4 stores messages in its non-volatile memory 12, or when it receives new messages from mobile device 6, 7 to which it is connected, as long as the connection between mobile device 6 and distant device 4 is active. The processing means 13 of each distant device is configured to:

- receive application messages M1, M2 recovered from all the devices to be supervised to which mobile devices 6, 7 have previously connected;
- receive acknowledgement messages MA1 associated with the application messages transmitted by distant device 4, that a mobile device 6 has recovered from all the devices to be supervised to which it has previously connected, notifying that all the devices to be supervised have effectively received the associated application messages M3;
- transmit towards mobile devices 6, 7 to which the distant device is connected all the messages M3, MA2, MA3 remaining in its non-volatile memory 12, that is, the non-acknowledged messages and the acknowledgement messages;
- suppress SU2 from non-volatile memory 12 the application messages M3 for which acknowledgement messages MA1 have been received; and
- store in non-volatile memory 12 an acknowledgement message MA2, MA3 for each received application message M1, M2.

Figure 4:
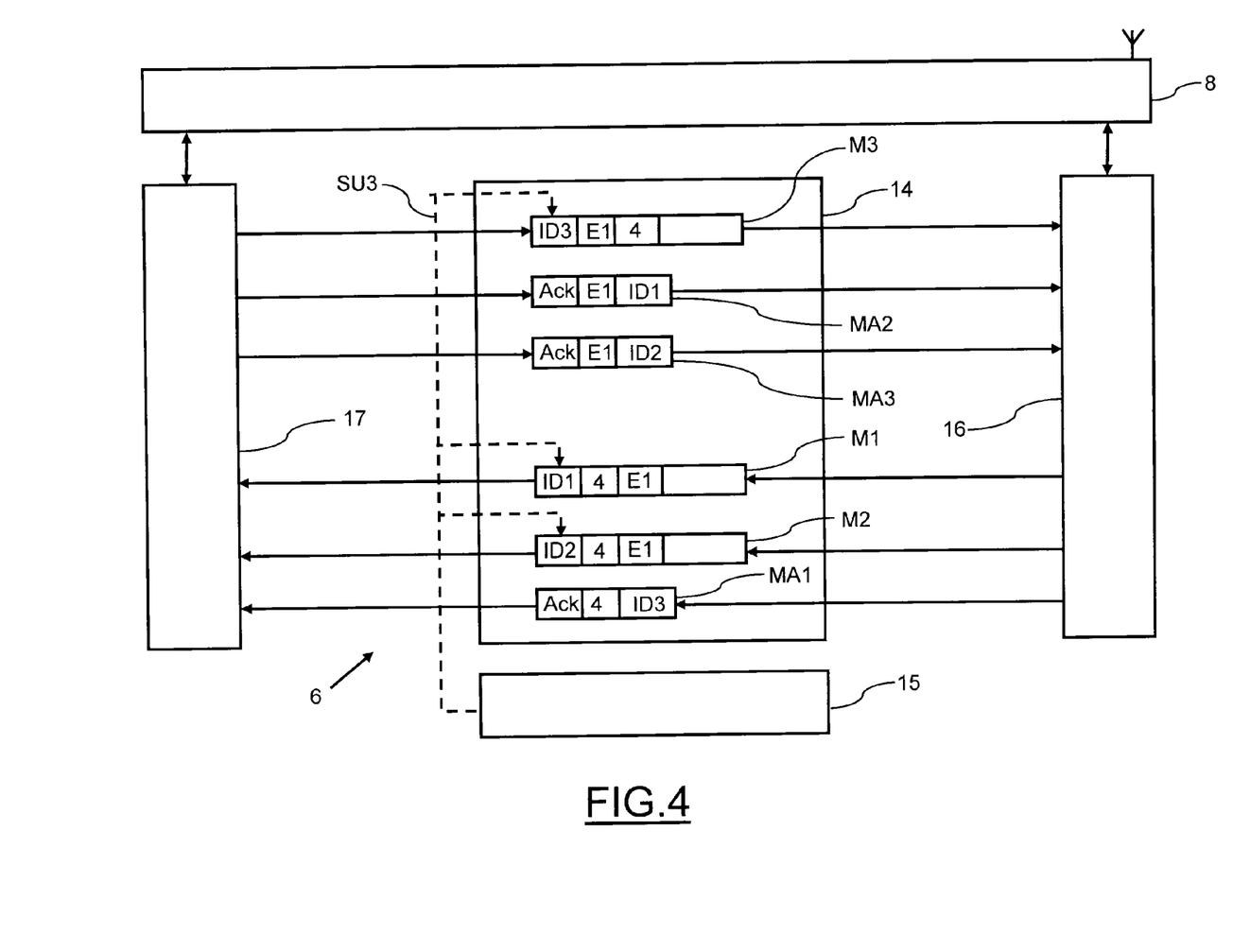
FIG. 4 schematically illustrates a mobile device.

FIG. 4 shows the different components of a mobile device 6, 7. Each mobile device 6, 7 comprises a non-volatile memory 14 configured to store messages to be transmitted M1 to M3 and MA1 to MA3, a message processing means 15 configured to transmit messages M1 to M3 and MA1 to MA3 stored in its non-volatile memory 14 to one or a plurality of devices to which it is connected. Each mobile device 6, 7 also comprises a first communication means 16 configured to establish an automatic connection with at least one device to be supervised E1 to E5, and a second communication means 17 configured to establish an automatic connection with at least one distant device 4, 5. An automatic connection is established each time the mobile device passes close to a device. The processing means 15 is further configured to store in non-volatile memory 14 all the messages received from the devices to which it has connected. When a mobile device 6, 7 connects to a distant device 4, via the wide area network, WAN, an automatic message transmission occurs. FIG. 4 for example shows mobile device 6. The message exchanges are immediately performed at the connection, and are then event-triggered when mobile device 6 stores new messages in its non-volatile memory 14 originating from devices to be supervised to which it is connected, while the connection between mobile devices 6 and distant device 4 is active. The processing means 15 of each mobile device 6, 7 is configured to:

- transmit to each distant device 4, 5 to which it is connected all the messages M1, M2, MA1 recovered from all the devices to be supervised to which it has previously connected, and particularly the messages M1, M2, MA1 which are intended for the distant devices to which it is connected; and
- receive the messages M3, MA2, MA3 transmitted by each distant device 4, 5 to which it is connected.

When a mobile device 6, 7 connects to one or a plurality of devices to be supervised E1 to E5, via the local area network, LAN, an automatic message transmission occurs. The messages exchanges are performed immediately at the connection, and are then event-triggered when mobile device 6 stores new messages in its non-volatile memory 14 originating from distant devices to which it is connected, as long as the connection between mobile device 6 and device to be supervised E1 is active. The processing means 15 of each mobile device 6, 7 are configured to:

- transmit to each device to be supervised to which it is connected, all the messages M3, MA2, MA3 recovered from all the distant devices to which it has previously connected, and in particular the messages which are intended for the devices to be supervised to which it is connected; and
- Receive the messages M1, M2, MA1 transmitted by the devices to be supervised to which it is connected.

Further, the processing means 15 of each mobile device 6, 7 is configured to suppress SU3, from its non-volatile memory 14, application messages M1 to M3 for which the associated acknowledgement messages have been received by mobile device 6, 7. In particular, the processing means 15 of each mobile device is configured to only transmit to the device to which it is connected the messages which are intended for the connected device. Further, each mobile device 6, 7 may comprise a list of specific devices for which messages are intended, and in particular of the devices which are authorized to exchange messages. Such a list is stored in non-volatile memory 14 of each mobile device 6, 7 and each mobile device is configured to automatically connect only to one at least of the specific devices belonging to the list. In this variation, each time a device to be supervised, or a distant device, is connected to a mobile device, the mobile device verifies whether it belongs to the list and accepts or not to process its messages. According to another variation, a mobile device which passes close to another mobile device may automatically establish a connection with this other mobile device. In this other variation, the mobile devices respectively transmit to one another their messages stored in their non-volatile memory. Thus, the transmission of the messages from first network 2 to second network 3 can be ensured, even if a mobile device which would have recovered the data of a set of devices to be supervised could no longer connect to second network 2, for example, if the mobile device should remain located with the set of devices to be supervised.

Generally, each mobile device, to be supervised or distant, of system 1, keeps in its non-volatile memory the application and acknowledgement messages which have been transmitted, until the mobile device receives an acknowledgement message associated with the application messages which have been transmitted. Each device of system 1 stores in its non-volatile memory all the messages for a longer period of time to handle the temporary unavailability of first and second networks 2, 3.

When a device receives an acknowledgement message, notifying that the addressee has effectively received the application message, the processing means of the device suppresses from its non-volatile memory the associated application message.

As a variation, in a message transmission, the processing means of each device may transmit to the device to which it is connected a single file comprising all the messages stored in its non-volatile memory.

Further, due to the multiplicity of the mobile devices of system 1, each device having messages addressed thereto, that it, each device to be supervised E1 to E5 or each distant device 4, 5 may receive a plurality of times the same application messages transmitted by a plurality of different mobile devices which successively pass close by. Thus, to suppress all redundant messages, each device having messages addressed thereto may comprise a serial number initialized at the zero value and stored in its non-volatile memory. The processing means of each device having messages addressed thereto is further configured to suppress a received application message if the received application message has an identifier less than or equal to the stored serial number. In the opposite case, that is, if the received application message has an identifier greater than the stored serial number, the processing means of the device for which messages are intended is configured to take into account the application message. Further, the processing means of each device to which messages are addressed increments the serial number of the addressee device if the identifier has a value consecutive to that of the stored serial number.

Further, each distant device 4, 5 may be configured so that:
- the distant device stores in the memory the identifier of each device to be supervised;
- the list of groups of devices to be supervised which may be simultaneously connected to a same mobile device;
- the geographic position of the devices to be supervised;
- managing a time counter for each device to be supervised to ensure that each device to be supervised has connected to at least one mobile device with a sufficient periodicity, that is, that the message exchanges could take place between this device and the distant device, for example, once a day;
- managing an alarm message for each device to be supervised to provide a maintenance, for example by notifying that this device has not been connected for too long or also that a device to be supervised, which should have been connected at the same time as others, has not;
- accordingly managing the alarm messages sent to the users' mobile devices according to maintenance needs;
- managing the versions of the software applications embedded in the devices to be supervised, for example, by sending the necessary updates;
- providing a guiding functionality to the users for the maintenance based on the knowledge of the location of a device to be supervised and on that of the user's mobile device;
- providing a time synchronization functionality of the devices to be supervised, via a clock internal to the mobile devices in order to enable the devices to be supervised to record and to accurately date the events that they generate.

Each device comprises, in its non-volatile memory, a software application which manages all possible transient situations linked to the number of mobile devices and to the number of devices to be supervised connected at each moment and the availability of the first and second device networks. Further, the software applications are configured to ensure that, over a determined time period, for example, one day, one week, or one month, all messages have been exchanged in both communication directions between the devices to be supervised and the distant devices.

Previously, the software message processing application is loaded into the non-volatile memory of each device.

Figure 5:
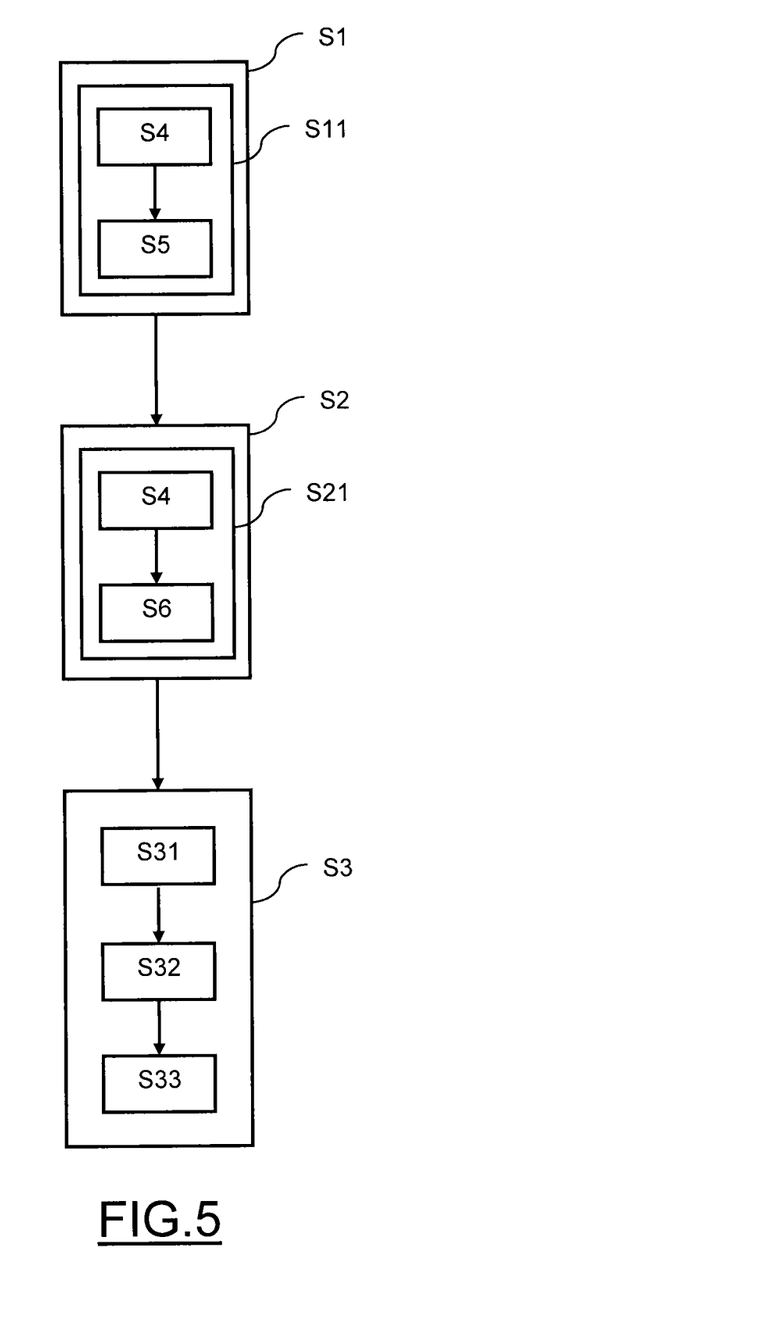
FIG. 5 schematically illustrates the main steps of a message transmission method according to the invention.

FIG. 5 schematically shows the main steps of a message transmission method. The method may be implemented by the message transmission system 1 which has just been described. It may be implemented within microprocessors embedded in each of the devices of system 1, or logic circuits, or implemented in software form.

The method comprises a first communication step S1 comprising at least one automatic connection S11 between a mobile device 6, 7 and at least one device E1 to E5 of first network 2, a second communication step S2 comprising at least one automatic connection S21 between a mobile device 6, 7 and at least one device 4, 5 of second network 3, and a step of processing the transmitted messages S3. Each automatic connection S11, S21 comprises transmitting S4 the messages stored in the non-volatile memory of mobile device 6, 7 of the connection to each connected device. Further, each automatic connection S11 of first step S1 comprises transmitting S5 the messages stored in the non-volatile memory of each device E1 to E5 of first network 2 which is connected, to non-volatile memory 14 of the mobile device of connection S11. Each automatic connection S21 of second step S2 comprises transmitting S6 the messages stored in the non-volatile memory of each device 4, 5 of second network 3 which is connected, to non-volatile memory 14 of the mobile device of connection S21. Further, processing step S3 comprises saving S31 the messages which have been transmitted by each of the devices of system 1, in the non-volatile memory of the device which has transmitted the message. Further, processing step S3 comprises, for each application message received by the device having the application message addressed thereto, storing S32 in the non-volatile memory of the addressee device an acknowledgement message associated with the received application message. Processing step S3 also comprises a step S33 of suppressing from the non-volatile memory of the device the application message associated with the received acknowledgement message.

The method and the system which have just been described are particularly adapted to message transmissions for which there are no real time constraints since the simultaneous availability of the two LAN and WAN networks is not always possible. They are thus particularly adapted to remote monitoring or remote control applications (remote maintenance services, remote meter reading . . . ) which require a simple solution where the supervised data may be locally stored and recovered with no losses, with a large periodicity. The possibility for the devices to be supervised to be mobile motor vehicles and for each mobile device to be configured to only communicate with the vehicle belonging to the user of the mobile device can also be envisaged. Thus, each time a user uses his/her vehicle, the remote maintenance service of the vehicle may be informed of all the defects of the vehicle, without waiting for a breakdown or a periodic visit to a garage.

The invention claimed is:

1. A method for transmitting messages between a first network of devices and a second network of devices, the method comprising:
   establishing a first automatic connection between a mobile device and at least one first device of the first network in response to verifying, by the mobile device, that the first device is included in a list of first devices stored in a non-volatile memory of the mobile device;
   receiving, via the first automatic connection, a message from the first device of the first network;
   storing, by the mobile device in the non-volatile memory, the message received from the first device of the first network;

establishing a second automatic connection between the mobile device and at least one second device of the second network; and transmitting, via the second automatic connection, the message, which is received from the first device of the first network and stored in the non-volatile memory of the mobile device, to the second device of the second network.

2. The method according to claim 1, wherein establishing the first automatic connection comprises establishing an automatic connection of the mobile device with devices belonging to the first network only.

3. The method according to claim 1, wherein establishing the second automatic connection comprises establishing an automatic connection of the mobile device with a single device belonging to the second network.

4. The method according to claim 1, wherein the first and second automatic connections are simultaneous or asynchronous.

5. The method according to claim 1, further comprising:
storing, in a non-volatile memory at each of the first device and the second device, messages to be transmitted;
receiving, by the non-volatile memory of the mobile device, via the first automatic connection, the messages stored in the non-volatile memory of the first device of the first network; and
receiving, by the non-volatile memory of the mobile device, via the second automatic connection the messages stored in the non-volatile memory of the second device of the second network.

6. The method according to claim 5, wherein the messages stored in the non-volatile memory of the first device of the first network comprise application messages intended for at least one addressee device belonging to the second network, the messages stored in the non-volatile memory of the second device of the second network comprise application messages intended for at least one addressee device belonging to the first network, the method further comprising;
processing the messages comprising, for each application message received by the device having the application message addressed thereto, storing in the non-volatile memory of the addressee device an acknowledgement message associated with the received application message, and, for each acknowledgement message received by a device, suppressing from the non-volatile memory of the device the application message associated with the received acknowledgement message.

7. The method according to claim 6, wherein
each application message comprises a unique non-zero identifier, and each device stores in its non-volatile memory a serial number initialized at a zero value, and
the processing of the transmitted messages comprises suppressing the application message received by a device in response to the identifier of the received application message being less than or equal to the serial number of the device, and incrementing the serial number of the device in response to the identifier having a value consecutive to that of the serial number of the device.

8. The method according to claim 1, wherein the list of first devices includes a list of specific devices for which messages are addressed, from the at least one second device.

9. The method according to claim 1, further comprising:
establishing a third automatic connection between the mobile device and at least one other mobile device; and transmitting all messages stored in the non-volatile memory of the mobile device to the at least one other mobile device.

10. A system for transmitting messages, the system comprising:
a mobile device including
a non-volatile memory, and
circuitry configured to
establish a first automatic connection with at least one first device of a first network, in response to verifying that the first device is included in a list of first devices stored in the non-volatile memory
receive, via the first automatic connection, a message from the first device of the first network,
store, in the non-volatile memory, the message received from the first device of the first network,
establish a second automatic connection with at least one second device of a second network, and
transmit, via the second automatic connection, the message, which is received from the first device of the first network and stored in the non-volatile memory, to the second device of the second network.

11. The system according to claim 10, wherein the circuitry is configured to establish the first automatic connection with devices belonging to the first network only.

12. The system according to claim 10, wherein the circuitry is configured to establish the second automatic connection with a single device belonging to the second network.

13. The system according to claim 10, wherein the circuitry is configured to establish the first and second automatic connections simultaneously or asynchronously.

14. The system according to claim 10, wherein
each of the first device and the second device comprises a non-volatile memory configured to store messages to be transmitted,
the first device of the first network comprises processing circuitry configured to transmit the messages stored in its non-volatile memory to the non-volatile memory of the mobile device to which it is connected, and
the second device of the second network comprises processing circuitry configured to transmit the messages stored in its non-volatile memory to the non-volatile memory of the mobile device to which it is connected.

15. The system according to claim 14, wherein
the messages stored in the non-volatile memory of the first device of the first network comprise application messages intended for at least one addressee device belonging to the second network, the messages stored in the non-volatile memory of the second device of the second network comprise application messages intended for at least one addressee device belonging to the first network,
each processing circuitry is configured to
store, in the non-volatile memory of an addressee device which receives an application message addressed thereto, an acknowledgement message associated with the received application message, and
suppress from the non-volatile memory of a device which receives an acknowledgement message the application message associated with the received acknowledgement message.

16. The system according to claim 15, wherein
each application message comprises a unique non-zero identifier, and each non-volatile memory comprises a serial number initialized at a zero value, and
each processing circuitry is configured to
suppress the application messages received by a device in response to the identifier of the received application message being less than or equal to the serial number of the device, and
increment the serial number of the device in response to the identifier having a value consecutive to that of the serial number of the device.

17. The system according to claim 10, wherein the first network corresponds to the Internet and the mobile device is a wireless smartphone.

18. A device comprising:
circuitry configured to
establish a first automatic connection with a first device of a first network, in response to a verification that the first device is included in a list of first devices stored in a non-volatile memory of the device,
receive, via the first automatic connection, a message from the first device of the first network,
store, in the non-volatile memory, the message received from the first device of the first network,
establish a second automatic connection with at least one second device of a second network, and
transmit, via the second automatic connection, the message, which is received from the first device of the first network and stored in the non-volatile memory, to the second device of the second network.

\* \* \* \* \*